United States Patent

Barton et al.

Patent Number: 5,480,014
Date of Patent: Jan. 2, 1996

[54] DOUBLE CLUTCH ARRANGEMENT

[75] Inventors: John R. Barton, Coventry; Christian J. Brace, Westbury, both of England

[73] Assignee: Massey Ferguson Manufacturing Limited, England

[21] Appl. No.: 146,149
[22] PCT Filed: Mar. 2, 1993
[86] PCT No.: PCT/GB93/00427
§ 371 Date: Nov. 8, 1993
§ 102(e) Date: Nov. 8, 1993
[87] PCT Pub. No.: WO93/18314
PCT Pub. Date: Sep. 16, 1993

[30] Foreign Application Priority Data

Mar. 10, 1992 [GB] United Kingdom .................. 9205163

[51] Int. Cl.⁶ ........................................... F16D 21/00
[52] U.S. Cl. .................. 192/48.3; 192/48.7; 192/87.1; 192/85 AA
[58] Field of Search .................. 192/48.3, 48.7, 192/48.91, 87.1, 85 AA

[56] References Cited

U.S. PATENT DOCUMENTS

| | | | |
|---|---|---|---|
| 1,138,098 | 5/1915 | Fornaca ........................ | 192/87.15 |
| 2,213,111 | 8/1940 | Stout ........................... | 192/85 AA X |
| 2,221,014 | 11/1940 | Williamson ................. | 192/85 AA X |
| 3,054,491 | 9/1962 | Bloch et al. . | |
| 3,190,421 | 6/1965 | Schulz .......................... | 192/85 AA |
| 3,596,537 | 8/1981 | Koivunen ..................... | 192/85 AA X |
| 3,765,519 | 10/1973 | Kell ............................... | 192/85 AA X |
| 4,026,400 | 5/1977 | Rawlings ...................... | 192/48.91 X |
| 4,044,869 | 8/1977 | Gros ............................. | 192/48.91 |
| 4,481,836 | 11/1984 | Richards . | |
| 4,807,732 | 2/1989 | Lehle ............................ | 192/48.7 X |
| 4,934,502 | 6/1990 | Horsch . | |
| 4,964,504 | 10/1990 | Friedman . | |
| 5,090,539 | 2/1992 | Wolf et al. ................... | 192/85 AA |

FOREIGN PATENT DOCUMENTS

| | | | |
|---|---|---|---|
| 2120472 | 8/1972 | France . | |
| 3115183 | 2/1982 | Germany . | |
| 3444103 | 6/1986 | Germany ..................... | 192/85 AA |
| 1-275919 | 11/1989 | Japan .......................... | 192/85 AA |
| 910162 | 11/1962 | United Kingdom . | |
| 1241744 | 8/1971 | United Kingdom . | |
| 2063395 | 6/1981 | United Kingdom . | |

Primary Examiner—Andrea L. Pitts
Attorney, Agent, or Firm—MacMillan, Sobanski & Todd

[57] ABSTRACT

A double clutch structure for connecting an input shaft to an output shaft while always maintaining a predetermined driving torque therebetween includes first and second clutches adapted to selectively connect the input shaft to the output shaft. An engaging structure is movable in a first direction to engage the first clutch and disengage said second clutch. The engaging structure is movable in a second direction to disengage the first clutch and engage the second clutch. A first Belleville spring reacts between the engagement structure and the first clutch for applying a clutch engaging pressure to the first clutch when the engagement structure is moved in the first direction. Similarly, a second Belleville spring reacts between the engagement structure and the second clutch for applying a clutch engaging pressure to the second clutch when the engagement structure is moved in the second direction. The first and second Belleville springs always apply a predetermined minimum clutch engaging pressure to at least one of the first and second clutches such that a predetermined driving torque is always maintained between the input shaft and the output shaft.

20 Claims, 2 Drawing Sheets

DOUBLE CLUTCH ARRANGEMENT

BACKGROUND OF THE INVENTION

This invention relates to clutches and in particular to clutches used to couple gear wheels to associated shafts in a vehicle transmission in order to engage selected drive ratios.

Such clutches are frequently arranged to be able to operate under load to provide a so-called "powershift" transmission in which ratio changes can be made without loss of driving torque through the transmission and without the operation of any associated main drive clutch. Frequently, such clutches are arranged in a double clutch arrangement positioned between two gear wheels with one clutch of the arrangement arranged to couple one gear to an associated shaft and the other clutch arranged alternatively to couple the other gear wheel to the same shaft.

Powershift transmissions are traditionally relatively bulky and expensive due to the relatively large size and complexity of existing ratio engaging clutches.

SUMMARY OF THE INVENTION

It is an object of the present invention to provide a double clutch arrangement which is suitable for use in a powershift transmission and which is particularly compact and economical to produce.

According to the present invention there is provided a double clutch arrangement including first and second clutches with an engaging means therebetween, the engaging means being movable in a first direction to engage the first clutch and disengage the second clutch and in a second direction opposite to said first direction to engage the second clutch and disengage the first clutch, and resilient means are positioned between the engaging means and each respective clutch such that all clutch engaging pressure is transmitted from the engaging means to each respective clutch via the resilient means so that during changes between the engaged states of the clutches the resilient means maintain sufficient clutch engagement pressure to ensure that the output torque of the arrangement never falls to zero.

In a preferred form the engaging means is moved in the first direction by spring means and in the second direction by fluid pressure.

Each resilient means preferably comprises one or more conical Belleville springs positioned between the engaging means and the associated clutch. The clearance between the engaging means, the Belleville springs and the clutches and the conical distortion of the Belleville springs ensuring that the output torque of the arrangement never falls to zero.

Preferably each clutch is of a multi-plate type.

The operation of the clutches may be further modulated by a modulating valve which controls the rate of increase and decrease of fluid pressure.

It is possible to provide a double clutch arrangement in accordance with the present invention whose width in an axial sense is no larger than the conventional axial width of a double mechanical gearbox synchroniser. Thus it would be possible to turn an existing gearbox provided with double mechanical synchronisers positioned between gear pairs into a powershift transmission by replacing each double synchroniser with a double clutch in accordance with the present invention.

One embodiment of the present invention, as applied to a tractor transmission, will now be described, by way of example only, with reference to the accompanying drawings in which:

DETAILED DESCRIPTION OF THE PREFERRED EMBODIMENT

Figure 1:
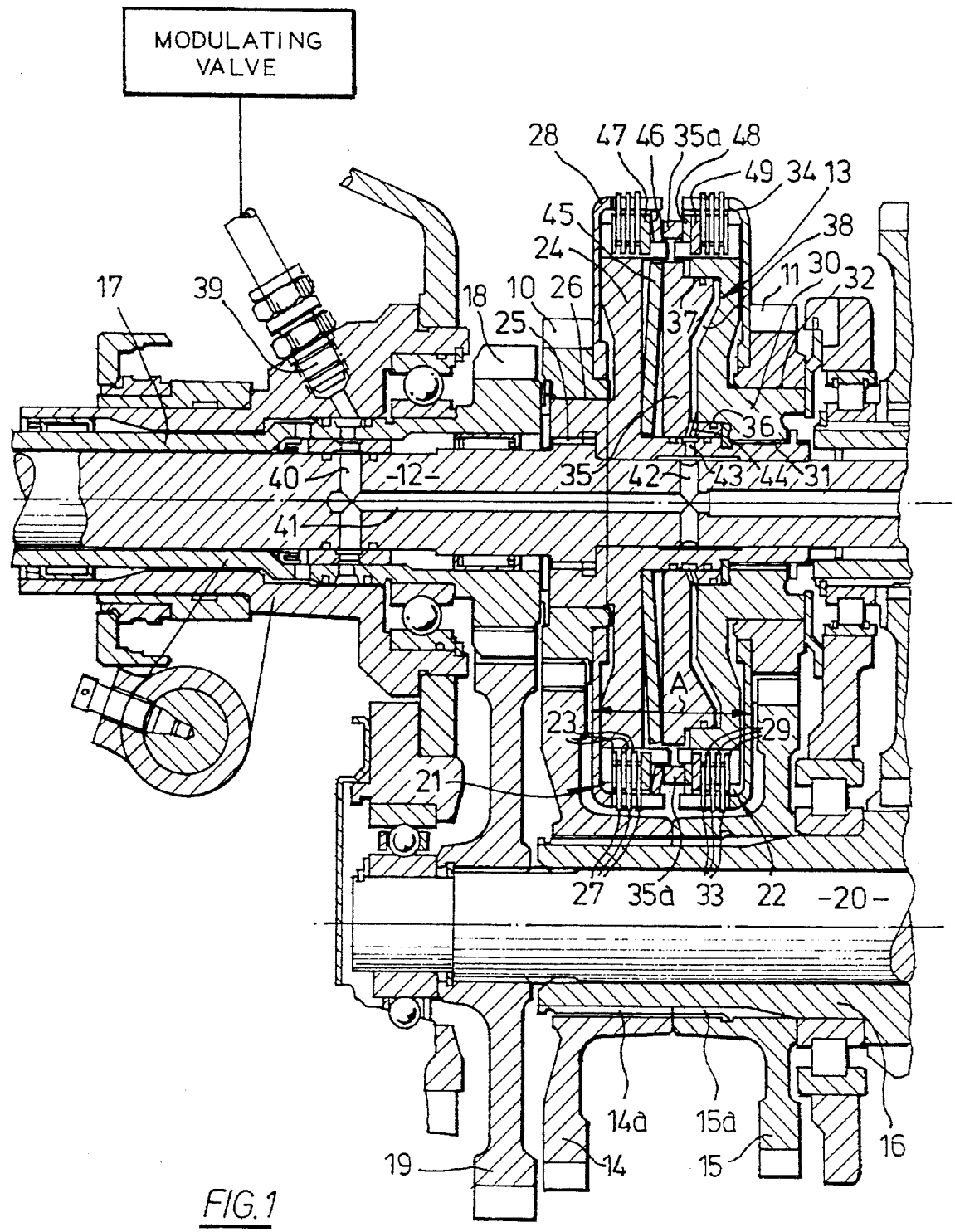
FIG. 1 shows a vertical section through part of a tractor gearbox which includes a double clutch in accordance with the present invention.

Referring to FIG. 1, this shows part of a tractor gearbox in which gears 10 and 11 are rotatably mounted around an input shaft 12 and are arranged to be selectively coupled to the shaft 12 via a double clutch arrangement 13. Gears 10 and 11 mesh respectively with gears 14 and 15 which are splined at 14a and 15a onto a hollow shaft 16 which drives the adjacent stage of the gearbox. A hollow shaft 17 surrounding input shaft 12 drives gear 18 which meshes with gear 19. Gear 19 is in turn splined on to a power-take-off drive shaft 20 which extends down the center of hollow shaft 16 to the rear of the tractor transmission.

Turning now to the details of the double clutch arrangement 13, this comprises first and second multi-plate clutches 21 and 22 respectively. Multi-plate clutch 21 comprises a first set of clutch plates 23 splined at their inner peripheries onto a support member 24, which is splined at 25 to the input shaft 12. The support member 24 also rotatably supports the gear 10 at interface 26. A second set of clutch plates 27 is splined onto a pressed steel dish-shaped member 28 which is electron beam welded to the gear member 10.

In a similar fashion the second multi-plate clutch 22 comprises a first set of clutch plates 29, which are splined at their inner peripheries onto a support member 30. Support member 30 is splined at 31 to the support member 24 which is itself splined to the input shaft 12. Support member 30 rotatably mounts gear 11 at interface 32. A second set of clutch plates 33 is splined onto a further dish-shaped member 34 which is electron beam welded onto gear 11.

Between the support members 24 and 30 a clutch engaging means in the form of a piston 35 is slidably mounted via a central bore 36 on support member 24 and via a shoulder 37 on support member 30. A sealed actuating chamber 38 is provided between the piston 35 and support member 30 into which hydraulic fluid under pressure can be fed via connection 39 and passages 40, 41, 42, 43, 44 to displace the piston 35 to the left as viewed in FIG. 1. A large Belleville spring 45 acts on the left-hand side of piston 35 to displace the piston to the right as viewed in FIG. 1.

The radially outer portion 35a of piston 35 extends between the clutches 21 and 22 and is able to apply a clutch-engaging force on clutch 21 via the Belleville spring 46 and a pressure plate 47 and a clutch-engaging pressure on clutch 22 via a Belleville spring 48 and a pressure plate 49.

At circumferentially spaced locations around the support members 24 and 30, the ends 24a and 30a (see FIG. 2) of the clutch plate splines extend through circumferentially spaced holes 35b in the piston 35 so that the support members 24 and 30 and the piston 35 rotate as a unit and locate springs 46 and 48.

Figure 2:
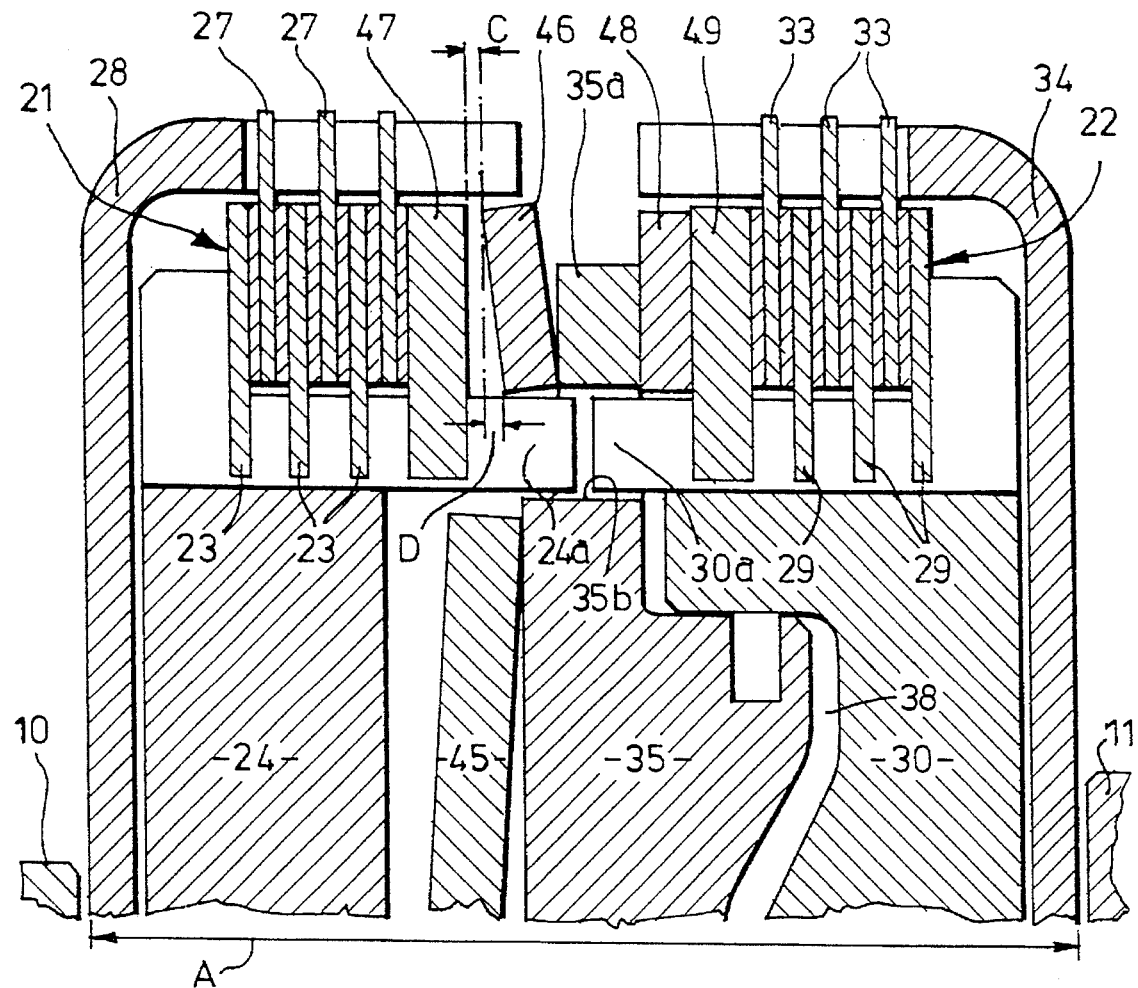
FIG. 2 is an enlarged view of part of FIG. 1.

FIGS. 1 and 2 show the double clutch arrangement with second clutch 22 engaged under the action of Belleville spring 45. This causes the radially outer portion 35a of piston 35 to compress Belleville spring 48 and hence clamp the pressure plate 49 and inter-leaved clutch plates 29 and 33 to couple gear 11 to input shaft 12.

As can be seen from FIG. 2, when the clutch 22 is fully engaged under the action of Belleville 45, a clearance C exists between Belleville 46 and the pressure plate 47 of clutch 21. This clearance C is less than the conical distortion D of Belleville 46, when Belleville 46 is in an unstressed condition.

If now, for example, the tractor operator wishes to disengage the gear train 11, 15 and engage the gear train 10, 14 he operates a button or other solenoid control (not shown), which moves a hydraulic flow control valve (not shown) to admit hydraulic fluid under pressure through fitting 39 and along passages 40, 41, 42, 43, 44 into chamber 38. This displaces piston 35 to the left as viewed in FIGS. 1 and 2 against the action Belleville spring 45. Initial movement of the piston 35 to the left as viewed in FIG. 2 takes up the clearance C between the Belleville 46 and pressure plate 47 and allows the Belleville 48 to begin to assume its natural conical form whilst still applying pressure at a reduced level to the inter-leaved clutch plates 29, 33.

The clearance C and the conical distortion D of the Bellevilles 46 and 48 are arranged to be such that before the level of clutch engagement pressure on plates 29, 33 has fallen to a sufficiently low level to stop all transmission of torque, the pressure of engagement on inter-leaved plates 23, 27 has risen to a level sufficient to give a torque transmission capability to clutch 21. Thus there is no intermediate condition between the disengagement of clutch 22 and the engagement of clutch 21 in which there is no torque transmission capability through the double clutch arrangement.

Figure 3:
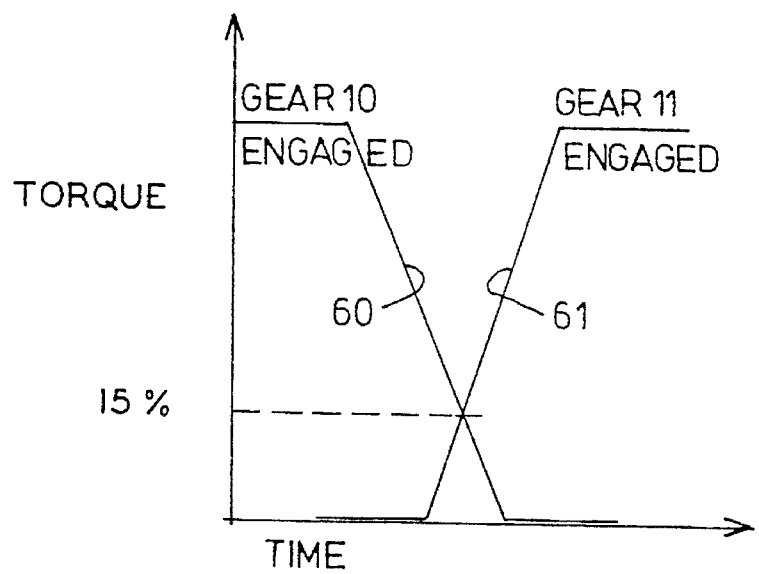
FIG. 3 shows the torque curve of the double clutch during changes in the state of engagement of the clutches.

This so-called torque overlap arrangement between clutches 21 and 22 is shown diagrammatically in FIG. 3 which shows the manner in which the torque transmitting capability of clutch 22 reduces along slope 60 and the torque transmitting capability of clutch 21 subsequently increases along slope 61. As can be seen from FIG. 3 at no time does the torque transmission capability of the overall double clutch arrangement fall below 15% of its maximum capability.

As will be appreciated, to engage clutch 22 the solenoid control is operated to move the hydraulic flow control valve to vent fluid pressure from chamber 38 and allow the Belleville spring 45 to begin the movement of piston 35 to the right. This takes up the clearance C which will initially exist between Belleville 48 and pressure plate 49 and allows Belleville 46 to begin to assume natural conical form so that there is again a controlled fall off in the driving torque of clutch 21 and a controlled build-up in the driving torque of clutch 22 in accordance with the curves of FIG. 3.

The operation of the double clutch arrangement can be readily modulated in a number of ways. For example, the number and size of the resilient Bellevilles 46 and 48 can be varied and the rate at which fluid is admitted into and exhausted from the chamber 38 can be controlled by a modulating valve which can conveniently be fitted in the vicinity of connection 39 which is relatively close to chamber 38.

As will be appreciated, the double clutch arrangement described above provides a particular compact axial dimension A which is typically of the order of 46 mm. This means that the double clutch arrangement described can be used in place of a typical double synchronizer in an existing gearbox (again typically of the order of 46 mm in axial length for a 114 mm diameter synchronizer) to convert a previously manually selected, synchronized ratio change between two ratios into a full powershift change.

What is claimed is:

1. A double clutch structure for connecting an input shaft to an output shaft while always maintaining a predetermined driving torque therebetween, said double clutch structure comprising:

a first clutch adapted to selectively connect the input shaft to the output shaft;

a second clutch adapted to selectively connect the input shaft to the output shaft;

an engaging means movable in a first direction to engage said first clutch and disengage said second clutch and in a second direction to disengage said first clutch and engage said second clutch;

a first resilient means reacting between said engagement means and said first clutch for applying a clutch engaging pressure to said first clutch when said engagement means is moved in said first direction; and a second resilient means reacting between said engagement means and said second clutch for applying a clutch engaging pressure to said second clutch when said engagement means is moved in said second direction;

said first and second resilient means always applying a predetermined minimum clutch engaging pressure to at least one of said first and second clutches such that a predetermined driving torque is always maintained between the input shaft and the output shaft.

2. The double clutch structure defined in claim 1 further including means for applying fluid pressure to said engagement means for urging said engagement means to move in said first direction.

3. The double clutch structure defined in claim 2 further including spring means for urging said engagement means to move in said second direction.

4. The double clutch structure defined in claim 1 wherein said engagement means includes a piston which is movable in said first and second directions.

5. The double clutch structure defined in claim 4 wherein a portion of said piston is positioned between said first and second clutches.

6. The double clutch structure defined in claim 4 wherein said piston is disposed within a chamber, and further including means for applying fluid pressure to said chamber for urging said piston to move in said first direction.

7. The double clutch structure defined in claim 6 wherein said means for applying fluid pressure includes a modulating valve to control the rate of increase and decrease of such fluid pressure.

8. The double clutch structure defined in claim 4 further including spring means for urging said piston to move in said second direction.

9. The double clutch structure defined in claim 8 wherein said spring means is a Belleville spring.

10. The double clutch structure defined in claim 1 wherein at least one of said first and second clutches are multi-plate friction clutches.

11. The double clutch structure defined in claim 1 wherein both of said first and second clutches is a multi-plate friction clutch.

12. The double clutch structure defined in claim 1 wherein said first resilient means is a Belleville spring.

13. The double clutch structure defined in claim 1 wherein said first and second resilient means are Belleville springs.

14. A transmission comprising:

an input shaft;

a first support member connected for rotation with said input shaft;

a second support member connected for rotation with said input shaft;

an output shaft;

a first gear connected for rotation with said output shaft;

a second gear connected for rotation with said output shaft;

a first clutch adapted to selectively connect said first support member to said first gear;

a second clutch adapted to selectively connect said second support member to said second gear;

an engaging means movable in a first direction to engage said first clutch and disengage said second clutch and in a second direction to disengage said first clutch and engage said second clutch;

a first resilient means reacting between said engagement means and said first clutch for applying a clutch engaging pressure to said first clutch when said engagement means is moved in said first direction; and a second resilient means reacting between said engagement means and said second clutch for applying a clutch engaging pressure to said second clutch when said engagement means is moved in said second direction;

said first and second resilient means always applying a predetermined minimum clutch engaging pressure to at least one of said first and second clutches such that a predetermined driving torque is always maintained between the input shaft and the output shaft.

15. The transmission defined in claim 14 wherein each of said first and second hubs includes a radially extending portion connected to said input shaft and an axially extending portion connected to said first and second clutches, respectively.

16. The transmission defined in claim 14 further including means for applying fluid pressure to said engagement means for urging said engagement means to move in said first direction.

17. The transmission defined in claim 16 wherein said means for applying fluid pressure includes a modulating valve to control the rate of increase and decrease of such fluid pressure.

18. The transmission defined in claim 16 further including spring means for urging said engagement means to move in said second direction.

19. The transmission defined in claim 14 wherein said engagement means includes a piston which is movable in said first and second directions.

20. The transmission defined in claim 19 wherein a portion of said piston is positioned between said first and second clutches.

* * * * *